(12) United States Patent
Takahashi et al.

(10) Patent No.: US 10,480,429 B2
(45) Date of Patent: Nov. 19, 2019

(54) CONTROLLER AND CONTROL METHOD FOR INTERNAL COMBUSTION ENGINE

(71) Applicant: Mitsubishi Electric Corporation, Tokyo (JP)

(72) Inventors: Tatsuhiko Takahashi, Kobe (JP); Takahiko Ono, Kobe (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 77 days.

(21) Appl. No.: 15/600,868

(22) Filed: May 22, 2017

(65) Prior Publication Data

US 2018/0100455 A1 Apr. 12, 2018

(30) Foreign Application Priority Data

Oct. 12, 2016 (JP) ................................. 2016-200658

(51) Int. Cl.
*F02D 41/00* (2006.01)
*F02B 33/44* (2006.01)
(Continued)

(52) U.S. Cl.
CPC .......... *F02D 41/0007* (2013.01); *F02B 33/44* (2013.01); *F02B 37/18* (2013.01);
(Continued)

(58) Field of Classification Search
CPC ............. F02B 37/18–186; F02D 23/00; F02D 41/0007
(Continued)

(56) References Cited

U.S. PATENT DOCUMENTS 4,467,606 A * 8/1984 Chaffiotte ............... F02B 37/18
60/602
2009/0071420 A1 3/2009 Huber et al.
(Continued)

FOREIGN PATENT DOCUMENTS

JP 2015-001170 A 1/2015
JP 2015-059549 A 3/2015

OTHER PUBLICATIONS

Communication dated Sep. 19, 2017, from Japanese Patent Office in counterpart application No. 2016-200658.
(Continued)

*Primary Examiner* — Ngoc T Nguyen
(74) *Attorney, Agent, or Firm* — Sughrue Mion, PLLC; Richard C. Turner

(57) ABSTRACT

The present invention provides a controller and a control method for an internal combustion engine, which can suppress the generation of an annoying collision noise and abnormal heating of a motor of an actuator, which are generated by contact of the output shaft of the actuator with an opening side stopper of the actuator. The controller and the control method for the internal combustion engine are configured such that a target opening (Sv) of the valve is set to the smaller of: a required target opening (Sv_dem) computed so that a target supercharging pressure (Sp) and an actual supercharging pressure (Pp) are matched with each other; and a restricted target opening (Sv_lmt) computed based on a fully closed position learning value (Pv_lrn), which corresponds to an actual position detected by a position sensor, when the valve is located in the fully closed position, and on the restricted target position.

4 Claims, 11 Drawing Sheets

(51) Int. Cl.
  *F02D 23/00*  (2006.01)
  *F02B 37/18*  (2006.01)
  *F02D 41/24*  (2006.01)

(52) U.S. Cl.
  CPC ............ *F02B 37/186* (2013.01); *F02D 23/00*
    (2013.01); *F02D 41/2464* (2013.01); *F02D
    2250/16* (2013.01); *Y02T 10/144* (2013.01)

(58) Field of Classification Search
  USPC .................................................. 60/602, 608
  See application file for complete search history.

(56) References Cited

U.S. PATENT DOCUMENTS

2017/0184012 A1* 6/2017 Maruo .................. F02B 37/186
2017/0314479 A1* 11/2017 Yamashita .............. F02D 23/00

OTHER PUBLICATIONS

Communication dated Jun. 27, 2019, from the State Intellectual Property Office of People's Republic of China in counterpart Application No. 201710640318.X.

* cited by examiner

CONTROLLER AND CONTROL METHOD FOR INTERNAL COMBUSTION ENGINE

BACKGROUND OF THE INVENTION

1. Field of the Invention

The present invention relates to a controller and a control method for an internal combustion engine configured to control a flow rate of exhaust gas of an internal combustion engine which flows to a turbocharger, by operating an actuator to adjust an opening of a valve.

2. Description of the Related Art

A turbocharger has been installed in an internal combustion engine in order to, for instance, improve the output of an internal combustion engine (hereafter called "engine"). The turbocharger includes a turbine configured to rotate by the exhaust gas of the engine, and a compressor configured to operate by the rotation of the turbine.

In the case of operating such a turbocharger, the engine may be damaged when the engine is operated at high rotation and high load, and by the excessive rise of pressure in the intake passage of the engine, that is, the supercharging pressure. Therefore an exhaust bypass passage is disposed in parallel with the turbine of the turbocharger. Further, a part of the exhaust gas that flows in the exhaust passage is branched to the exhaust bypass passage using a waste gate valve disposed in the exhaust bypass passage, to adjust the flow rate of the exhaust gas to the turbine, and to control the supercharging pressure at an optimum value.

The waste gate valve opens/closes by the driving of a positive pressure actuator, for example. In concrete terms, the opening of the waste gate valve is adjusted by driving the positive pressure actuator when the pressure in the intake passage of the engine, particularly the pressure in the upstream portion of a throttle valve where pressure increases, becomes higher than the atmospheric pressure.

Normally in a period until the driving of the positive pressure actuator becomes possible, the waste gate valve is in a fully closed state. In the following description, the waste gate valve is called the WGV, and the waste gate actuator, which operates the WGV, is called the WGA.

In the case of the positive pressure actuator, the WGV cannot be operated unless the pressure in the intake passage of the engine becomes higher than the threshold. In other words, if this pressure is the threshold or less, the WGV cannot be operated, therefore the opening of the WGV cannot be changed.

As a result, recently a system that can freely restrict supercharging by the turbocharger by operating the WGA by electricity and driving the WGV when necessary, without depending on the pressure in the intake passage of the engine, was proposed. However, in this kind of system, an error is generated between the detected value of a WGV opening sensor and an actual WGV opening because of the influence of age related deterioration caused by the repeated opening/closing of the WGV for a long period of time, the temperature characteristics of the WGV opening sensor, the thermal expansion of the structure constituting the WGV and the like.

As a result, a reference position of the WGV, that is, a position of the WGV when the detected value of the WGV opening sensor is 0%, is shifted from the position where the WGV is the actual fully closed position. This means that even if the WGV is controlled to a target opening, the target opening is shifted from the actual WGV opening. As a consequence, control to a desired supercharging pressure may become impossible, or a supercharging pressure may not reach the control target value.

Therefore in a prior art according to Japanese Patent Application Laid-Open No. 2015-59549, if it is determined that the actual opening reached a fully closed state when the target opening is "fully closed", the fully closed position is learned based on the output value of the opening sensor at this time, and the fully closed position learning value is corrected to a value that matches with the sensor output characteristic change, in accordance with the temperature change from the point when the fully closed position learning value was updated. By configuring [the controller] like this, the control accuracy of the WGV mechanism can be maintained, even if the temperature conditions change.

SUMMARY OF THE INVENTION

As mentioned above, an error is generated between the detected value of the WGV opening sensor and the actual WGV opening, because of the influence of the age related deterioration caused by the repeated opening/closing of the WGV for a long period of time, the temperature characteristics of the WGV opening sensor, the thermal expansion of the structure constituting the WGV and the like. In the case of the prior art according to Japanese Patent Application Laid-Open No. 2015-59549, on the other hand, errors between the fully closed position learning value and the actual fully closed position are reduced by learning the fully closed position and correcting the shift of the fully closed position caused by the temperature change.

To learn the fully closed position in the prior art disclosed in Japanese Patent Application Laid-Open No. 2015-59549, the WGV must be controlled to the fully closed position. However, if the WGV is fully closed, the supercharging pressure rises, and, depending on the manner of driving, a chance to learn the fully closed position may not be acquired, and a state of not updating the fully closed position learning value may continue. In this case, the fully closed position learning value that is shifted from the actual fully closed position is continuously stored. Hence even if the fully closed position learning value that is shifted from the actual fully closed position is corrected in accordance with the temperature change, the change amount of the fully closed position with respect to the temperature change is merely an estimated value, and this estimation accuracy deteriorates over time.

Therefore if the chances to update the fully closed position learning value are few in the prior art according to Japanese Patent Application Laid-Open No. 2015-59549, the fully closed position learning value may shift from the actual fully closed position. If the required target opening becomes fully open in the state where the fully closed position learning value is shifted from the actual fully closed position, the actual opening becomes too wide.

In other words, if the fully closed position learning value matches with the actual fully closed position, the output shaft of the WGA never contacts with the opening side stopper of the WGA at a speed exceeding the critical collision speed, even if the WGA is driven by feedback control so that the maximum target opening (the maximum value of the target opening) and the actual opening match with each other. This is because the actual opening change speed decelerates as the actual opening becomes closer to the target opening, or a fully opened position for control is set to have a smaller opening than at the opening side stopper position of the WGA.

However if the fully closed position learning value is shifted to the opening side from the actual fully closed position, the position corresponding to the maximum target opening may become a position closer to the opening side than the opening side stopper position of the WGA. If the WGA is driven by feedback control in this state so that the maximum target opening and the actual opening match with each other, the output shaft of the WGA may contact the opening side stopper of the WGA at a speed exceeding the critical collision speed. As a result, the output shaft of the WGA may contact the opening side stopper of WGA at a speed exceeding the critical collision speed, and an annoying collision noise may be generated.

Further, if the state of the output shaft contacting the opening side stopper of the WGA continues, the drive current, to drive the WGA, may increase too much, and cause overheating of the motor of the WGA. In other words, the output shaft of the WGA cannot be moved to a position at the opening side exceeding the contact position of the output shaft of the WGA and the opening side stopper of the WGA. Therefore if the target opening of the WGV is set to the opening side exceeding the opening corresponding to this contact position, a deviation remains between the target opening and the actual opening. As a result, the operation quantity of the WGA increases by feedback control, and overheating of the motor of the WGA may be generated.

With the foregoing in view, it is an object of the present invention to provide a controller and a control method for an internal combustion engine that can suppress the generation of an annoying collision noise and the overheating of the motor of the actuator, which may be generated by the contact of the output shaft of the actuator with the opening side stopper of the actuator.

A controller for an internal combustion engine according to the present invention is a controller for an internal combustion engine, the controller controlling a flow rate of exhaust gas of the internal combustion engine which flows to a turbocharger, by operating an actuator to adjust an opening of a valve, and the controller including: a target supercharging pressure computing unit configured to compute a target supercharging pressure, based on an operating state of the internal combustion engine; a required target opening computing unit configured to compute a required target opening of the valve so that the target supercharging pressure computed by the target supercharging pressure computing unit and an actual supercharging pressure detected by a supercharging pressure sensor configured to detect a pressure of intake air of the internal combustion engine, which has been supercharged by the turbocharger, are matched with each other; a reference position learning unit configured to set, as a fully closed position learning value, an actual position of the valve detected by a position sensor, which is configured to detect an actual position of a valve, when the valve is located in a fully closed position; an actual opening computing unit configured to compute an actual opening of the valve, based on the actual position detected by the position sensor and the fully closed position learning value which has been set by the reference position learning unit; a restricted target opening computing unit configured to compute a restricted target opening of the valve, based on the fully closed position learning value which has been set by the reference position learning unit and a restricted target position which has been set, in advance, to a closing side relative to an opening side stopper position of the actuator; a target opening restricting unit configured to set, as a target opening of the valve, the smaller of: the required target opening computed by the required target opening computing unit; and the restricted target opening computed by the restricted target opening computing unit; an operation quantity computing unit configured to compute an operation quantity to operate the actuator, so that the actual opening computed by the actual opening computing unit follows the target opening which was set by the target opening restricting unit; and a driving unit configured to operate the actuator in accordance with the operation quantity computed by the operation quantity computing unit.

A control method for an internal combustion engine according to the present invention is a control method for an internal combustion engine to control a flow rate of exhaust gas of the internal combustion engine which flows to a turbocharger, by operating an actuator to adjust an opening of a valve, the method including: a target supercharging pressure computing step of computing a target supercharging pressure, based on an operating state of the internal combustion engine; a required target opening computing step of computing a required target opening of the valve so that the target supercharging pressure computed in the target supercharging pressure computing step and an actual supercharging pressure detected by a supercharging pressure sensor configured to detect a pressure of intake air of the internal combustion engine, which has been supercharged by the turbocharger, are matched with each other; a reference position learning step of setting, as a fully closed position learning value, an actual position of the valve detected by a position sensor, which is configured to detect an actual position of a valve, when the valve is located in a fully closed position; an actual opening computing step of computing an actual opening of the valve, based on the actual position detected by the position sensor and the fully closed position learning value which has been set in the reference position learning step; a restricted target opening computing step of computing a restricted target opening of the valve, based on the fully closed position learning value which has been set in the reference position learning step and a restricted target position which has been set, in advance, at a closing side relative to an opening side stopper position of the actuator; a target opening restricting step of setting, as a target opening of the valve, the smaller of: the required target opening computed in the required target opening computing step and the restricted target opening computed in the restricted target opening computing step; an operation quantity computing step of computing an operation quantity to operate the actuator so that the actual opening computed in the actual opening computing step follows the target opening which has been set in the target opening restricting step; and a driving step of operating the actuator in accordance with the operation quantity computed in the operation quantity computing step.

According to the present invention, a controller and a control method for an internal combustion engine that can suppress the generation of an annoying collision noise and overheating of the motor of the actuator, which may be generated by the contact of the output shaft of the actuator with the opening side stopper of the actuator, can be provided.

DESCRIPTION OF THE PREFERRED EMBODIMENTS

Embodiments of the controller and the control method for an internal combustion engine according to the present invention will be described with reference to the drawings. In the description of the drawings, the same or corresponding composing element is denoted with the same reference sign, and redundant description is omitted. The present invention can be applied to an internal combustion engine in which a turbocharger for a vehicle is installed, for example.
Embodiment 1

Figure 1:
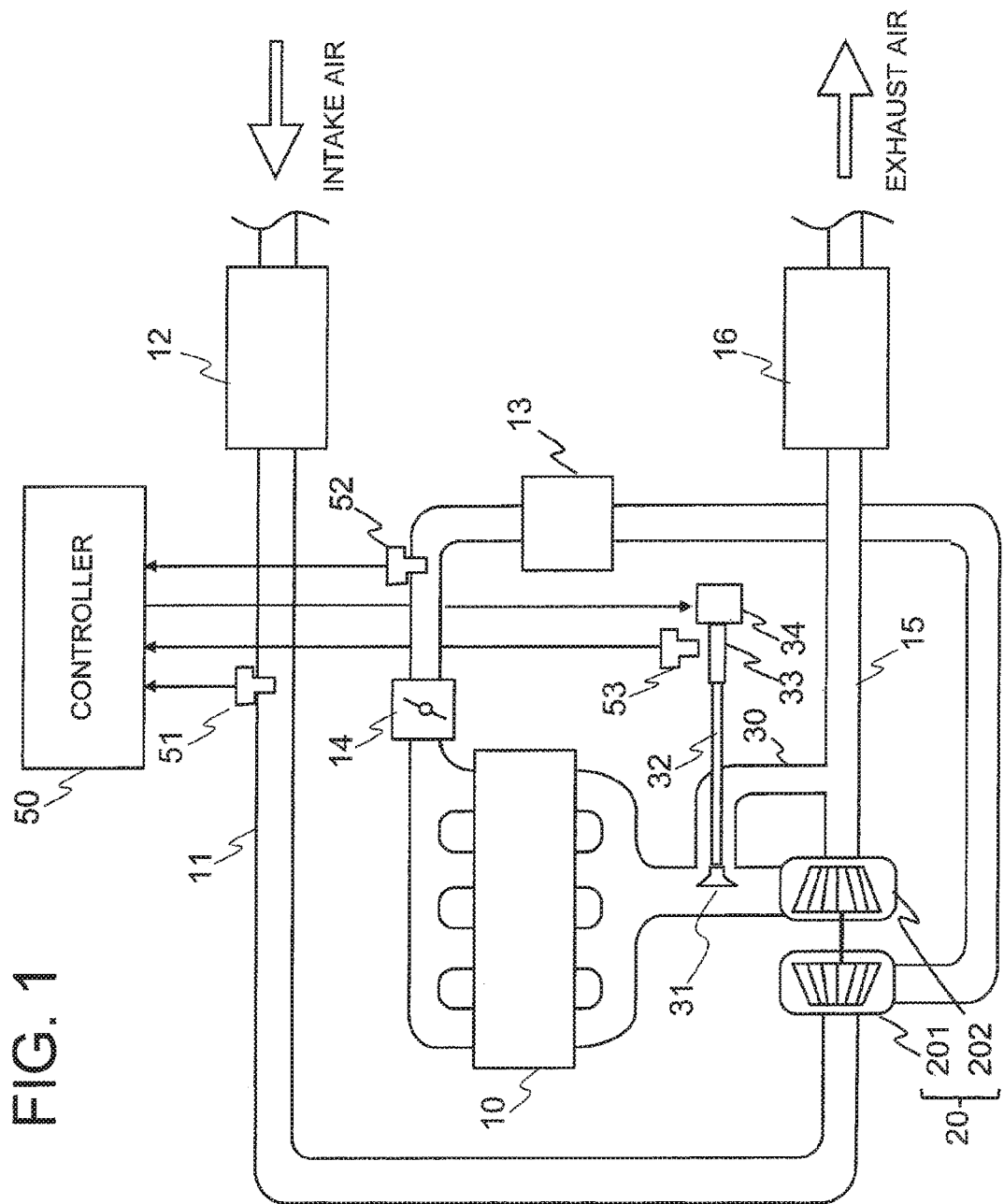
FIG. 1 is a block diagram depicting an engine system to which a controller of an engine according to Embodiment 1 of this invention is applied.

FIG. 1 is a block diagram depicting an engine system to which a controller 50 of an engine 10 according to Embodiment 1 of the present invention is applied. In FIG. 1, an air cleaner 12 is disposed at an entrance of an intake passage 11 of the engine 10. An air flow sensor 51, for detecting the intake air amount, is disposed at the downstream side of the air cleaner 12.

A turbocharger 20 is disposed at the downstream side of the air flow sensor 51. The turbocharger 20 includes a compressor 201 and a turbine 202. The compressor 201 and the turbine 202 are integrally connected by a connecting shaft. The compressor 201 is rotary driven by the energy of the exhaust gas of the engine 10, which is input to the turbine 202.

An intercooler 13, for cooling compressed air, is disposed at the downstream side of the compressor 201. A throttle valve 14 is disposed at the downstream side of the intercooler 13. A supercharging pressure sensor 52, for detecting the pressure of the intake air of the engine 10 supercharged by the turbocharger 20, is disposed between the intercooler 13 and the throttle valve 14.

An exhaust system of the engine 10 includes an exhaust passage 15. The turbine 202 of the turbocharger 20 is disposed in the middle of the exhaust passage 15. An exhaust bypass passage 30, connecting the entrance side and the exit side of the turbine 202 by bypassing the turbine 202, is also disposed in the exhaust passage 15.

A WGV 31, used as an exhaust bypass valve, is disposed in the exhaust bypass passage 30. An exhaust purification catalyst 16, for purifying the exhaust gas, is disposed at the downstream side of the turbine 202.

The WGV 31 disposed in the exhaust bypass passage 30 is mechanically connected to one end of a joint member 32. The other end of the joint member 32 is mechanically connected to a WGA output shaft 33, which is an output shaft of a WGA 34 used as an exhaust bypass valve driving device.

A position sensor 53, for detecting the position information on the position of the WGV 31, is disposed near the WGA output shaft 33. In this embodiment, the position sensor 53 is configured separately from the WGA 34, but may be integrated in the WGA 34.

Besides the air flow sensor 51, the supercharging pressure sensor 52, and the position sensor 53, various sensors, such as a crank angle sensor (not illustrated) to detect a crank angle and an accelerator opening sensor (not illustrated) to detect the accelerator opening, are connected to the input portion of the controller 50 so as to detect the operating state of the engine 10.

Besides the WGA 34, various devices, such as an injector (not illustrated) and an ignition coil (not illustrated), are connected to the output portion of the controller 50 so as to control the operating state of the engine 10. The controller 50 controls the combustion state and the output torque of the engine 10 to the optimum by driving the various devices based on the various input information input from various sensors respectively.

Figure 2:
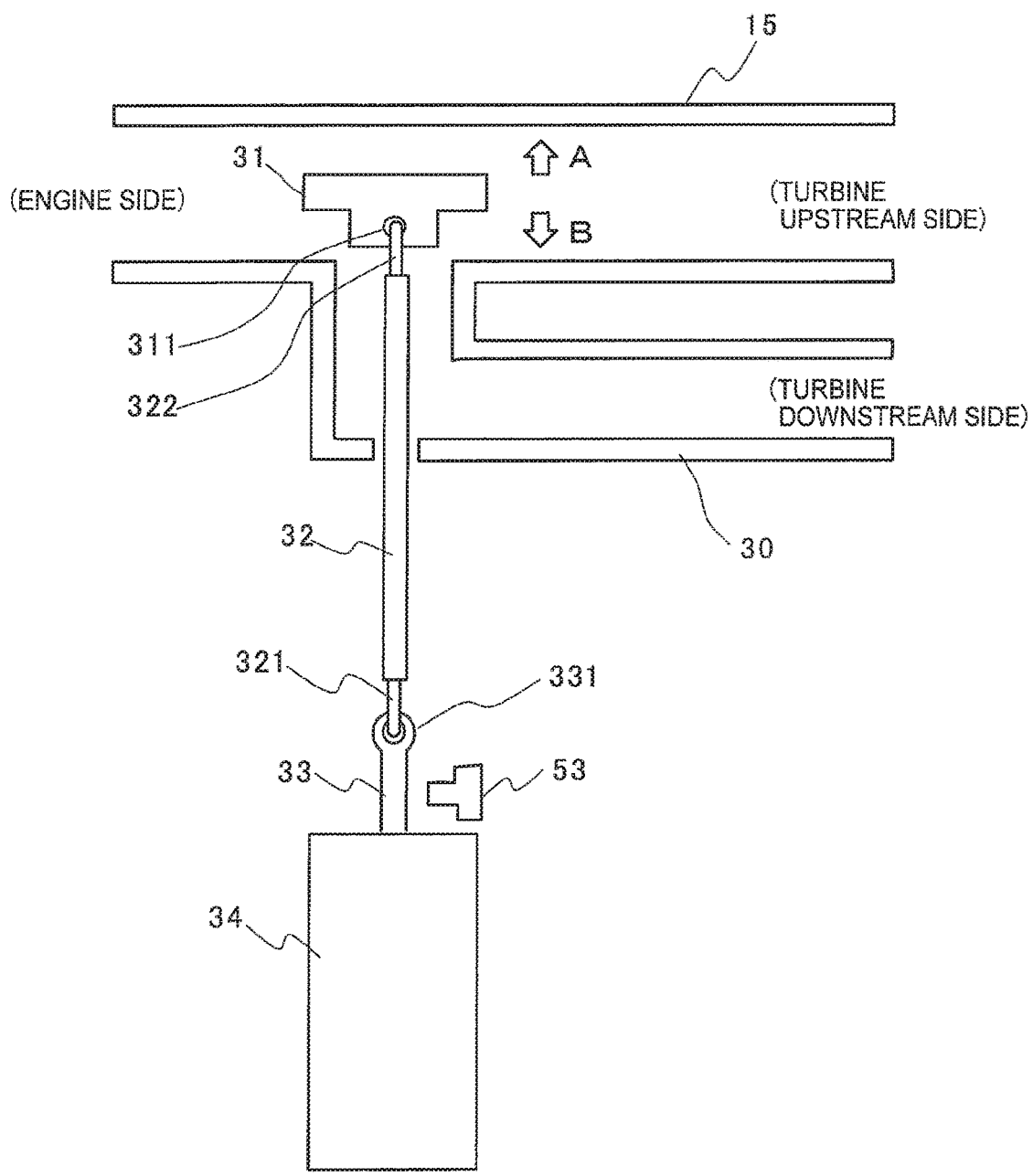
FIG. 2 is a schematic diagram depicting a mechanical connection state between a WGV and a WGA according to Embodiment 1 of this invention.

Next the mechanical connection state between the WGV 31 and the WGA 34 will be described with reference to FIG. 2. FIG. 2 is a schematic diagram depicting the mechanical connection state between the WGV 31 and the WGA 34 according to Embodiment 1 of this invention.

In FIG. 2, the WGV 31 and the WGA 34 are not directly connected, but are connected via the joint member 32. To be more precise, an annular WGA output shaft engaging portion 331, which is formed on one end of the WGA output shaft 33, and an annular first joint member engaging portion 321 formed on one end of the joint member 32, penetrate each other so as to freely oscillate while engaged with each other. A WGV engaging portion 311 which has a through hole disposed in the WGV 31, and an annular second joint member engaging portion 322 formed on the other end of the joint member 32, are engaged so as to freely oscillate while the second joint member engaging portion 322 penetrates the through hole of the WGV engaging portion 311.

The WGV 31, which is disposed in the exhaust passage 15, is exposed to the exhaust gas emitted from the engine 10, and reaches a high temperature of several hundred degrees. Therefore considering the heat resistance of the WGA 34, which includes such electronic components as the motor, the WGA 34 cannot be disposed near the WGV 31. Therefore the joint member 32 is disposed between the WGV 31 and the WGA 34 so that the temperature of the WGA 34 does not become too high. Furthermore, the mechanical connection of the WGA 34 and the WGV 31 via the joint member 32 provides more flexibility to the installation location of the WGA 34 in the vehicle, which makes layout design easier. This is another reason why the joint member 32 is used between the WGV 31 and the WGA 34.

The WGA 34 encloses the motor which can rotate forward and backward, and the WGA 34 also includes the WGA output shaft 33 which converts the rotary motion of this motor into linear motion, and outputs this linear motion. The WGA output shaft 33 can move in the shaft direction according to the energizing direction of the motor.

In concrete terms, if the motor is energized in the direction of pushing the WGA output shaft 33 toward the outside of the WGA 34, the WGV 31 can be moved to the valve opening side (that is, the direction of arrow A in FIG. 2) via the joint member 32. On the other hand, if the motor is energized in the direction of pulling the WGA output shaft 33 into the WGA 34, the WGV 31 can be moved in the valve closing side (that is, the direction of arrow B in FIG. 2) via the joint member 32. If the motor is not energized at all, the WGV 31 can be stopped without moving the WGV 31 to the valve closing side or the valve opening side, unless a disturbance, such as exhaust gas flow, is generated.

The position sensor 53 is disposed near the side portion of the WGA output shaft 33. The position sensor 53 detects a position of the WGA output shaft 33 in the shaft direction as the position information correlated to the position of the WGV 31. The position of the WGA output shaft 33 in the shaft direction detected by this position sensor 53 is input to the controller 50 as a position of the WGV 31, that is, as a valve opening position, or a valve closing position of the WGV 31, or an arbitrary position therebetween.

Figure 3:
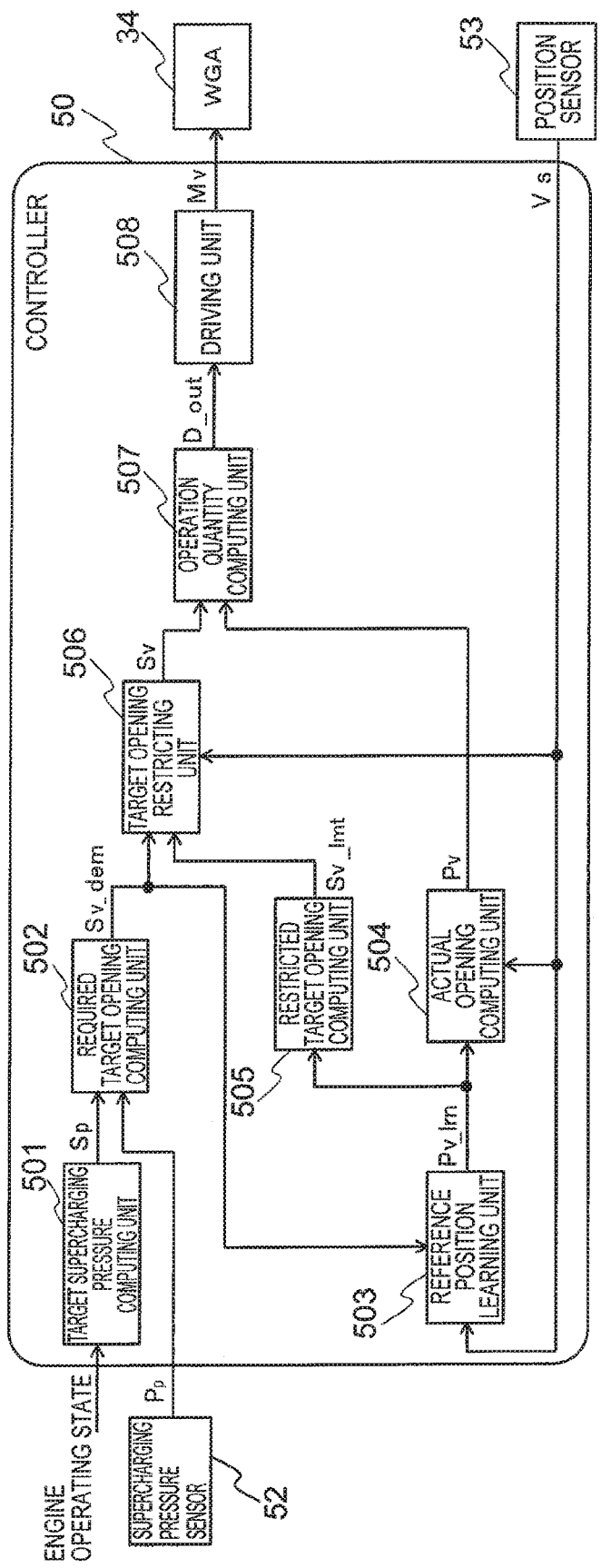
FIG. 3 is a block diagram depicting a configuration of the controller according to Embodiment 1 of this invention.

Now the configuration of the controller 50 according to Embodiment 1 will be described with reference to FIG. 3. FIG. 3 is a block diagram depicting a configuration of the controller 50 according to Embodiment 1 of this invention. The controller 50 is constituted by, for example, a central processing unit (CPU) which executes the computing processing, a read only memory (ROM) which stores such data as program data and fixed value data, and a random access memory (RAM) which is sequentially overwritten when updating the stored data. Each functional block of the controller 50 in FIG. 3 is stored in ROM as software.

As depicted in FIG. 3, the controller 50 has a target supercharging pressure computing unit 501, a required target opening computing unit 502, a reference position learning unit 503, an actual opening computing unit 504, a restricted target opening computing unit 505, a target opening restricting unit 506, an operation quantity computing unit 507, and a driving unit 508 as the control functions of the WGV 31. Further, in addition to these control functions of the WGV 31, the controller 50 also has a control function to integrally control the engine 10 based on various input information input from various sensors, that is, the detection results by various sensors.

To the target supercharging pressure computing unit 501, a plurality of information to indicate the operating state of the engine 10, such as the engine rotation speed which was computed based on the crank angle detected by the crank angle sensor, and the accelerator opening detected by the accelerator opening sensor, are input. Based on the input engine operating state, the target supercharging pressure computing unit 501 computes the target supercharging pressure Sp as the control target value.

Figure 4:
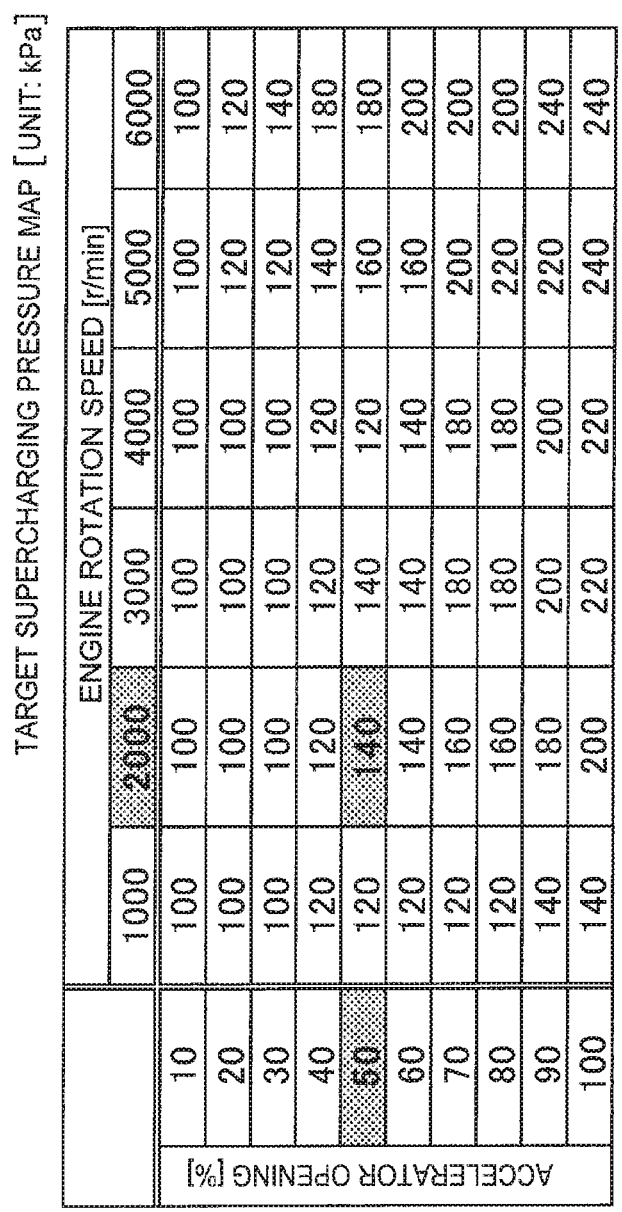
FIG. 4 is a table showing an example of a map that is used when a target supercharging pressure computing unit computes a target supercharging pressure according to Embodiment 1 of this invention.

Now an example of the method used when the target supercharging pressure computing unit 501 computes the target supercharging pressure Sp will be described with reference to FIG. 4. FIG. 4 shows an example of a map used when the target supercharging pressure computing unit 501 of Embodiment 1 of this invention computes the target supercharging pressure Sp. In the map in FIG. 4, the unit of the target supercharging pressure is [kPa].

In the target supercharging pressure map in FIG. 4, the engine rotation speed [r/min], the accelerator opening [%] and the target supercharging pressure [kPa] are corresponded. The target supercharging pressure computing unit 501 computes the target supercharging pressure Sp corresponding to the engine rotation speed and the accelerator opening based on this map.

For example, it is assumed that the engine rotation speed 2000 [r/min] and the accelerator opening 50 [%] are input to the target supercharging pressure computing unit 501 as the engine operating state. In this case, the target supercharging pressure computing unit 501 sets the target supercharging pressure Sp to 140 [kPa] based on this map. The target supercharging pressure computing unit 501 may be configured to determine the target supercharging pressure Sp by calculation according to a predetermined physical model, without using the map in FIG. 4.

Referring back to FIG. 3, the required target opening computing unit 502 computes the required target opening Sv_dem of the WGV 31, so that the target supercharging pressure Sp computed by the target supercharging pressure computing unit 501 matches with the actual supercharging pressure Pp detected by the supercharging pressure sensor 52. In other words, the required target opening computing unit 502 computes the required target opening Sv_dem, which is required to match the actual supercharging pressure Pp with the target supercharging pressure Sp.

The reference position learning unit 503 performs the fully closed position learning to set the actual position Vs of the WGV 31 detected by the position sensor 53 when the WGV 31 is located in the fully closed position, as the fully closed position learning value Pv_lrn.

The fully closed position is a position of the WGV 31 when the WGV 31 completely blocks the exhaust bypass passage 30. The fully closed position learning value Pv_lrn cannot be computed unless the WGV 31 enters the fully closed state, hence a predetermined initial value is set as the fully closed position learning value Pv_lrn until the fully closed position learning completes since when the WGV 31 is controlled to enter the fully closed state.

The actual opening computing unit 504 computes the actual opening Pv of the WGV 31 with respect to the fully closed position learning value Pv_lrn, based on the actual position Vs detected by the position sensor 53 and the fully closed position learning value Pv_lrn, which was set by the reference position learning unit 503.

The restricted target opening computing unit 505 computes the restricted target opening Sv_lmt of the WGV 31 based on the fully closed position learning value Pv_lrn which was set by the reference position learning unit 503, and the restricted target position which was set in advance. An actual setting method for the restricted target position will be described later, but in Embodiment 1, a case when the restricted target position is set to 4.1 V is described as an example.

The target opening restricting unit 506 sets the smaller of: the required target opening Sv_dem computed by the required target opening computing unit 502; and the restricted target opening Sv_lmt computed by the restricted target opening computing unit 505, as the target opening Sv of the WGV 31.

The operation quantity computing unit 507 computes the operation quantity D_out to operate the WGA 34, so that the actual opening Pv computed by the actual opening computing unit 504 follows the target opening Sv, which was set by the target opening restricting unit 506. In other words, the operation quantity computing unit 507 computes the operation quantity D_out that is required to match the actual opening Pv with the target opening Sv by the feedback control based on the target opening Sv and the actual opening Pv.

The driving unit 508 outputs the operation quantity Mv, for operating the WGA 34, to the WGA 34 according to the operation quantity D_out computed by the operation quantity computing unit 507, so that the opening of the WGV 31 is adjusted by the operation of the WGA 34.

Figure 5:
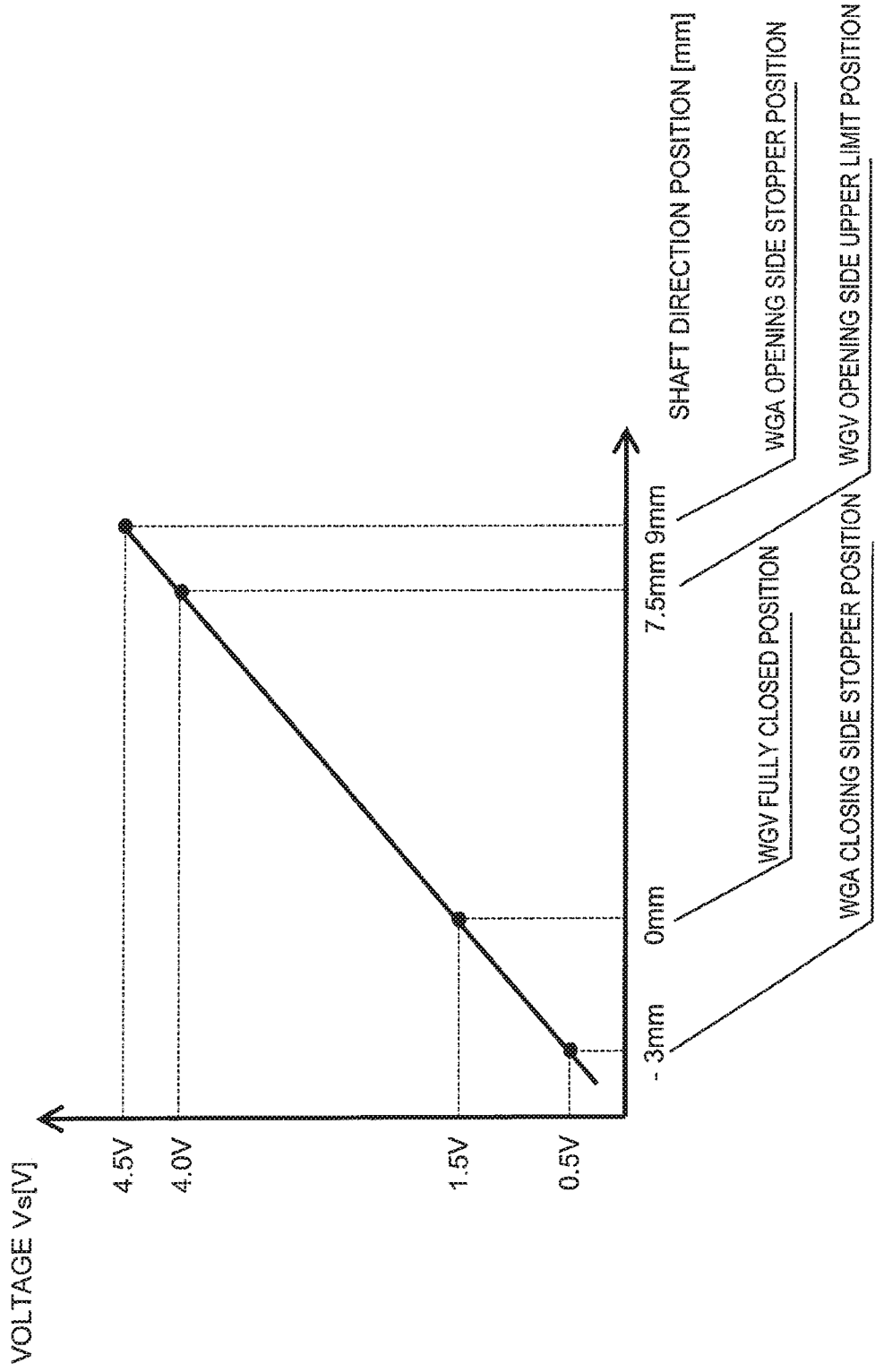
FIG. 5 is a graph depicting a relationship between a shaft direction position of the WGA output shaft and an actual position detected by a position sensor of Embodiment 1 of this invention.

Now the relationship between the shaft direction position of the WGA output shaft 33 and the actual position Vs detected by the position sensor 53 will be described with reference to FIG. 5. FIG. 5 is a graph depicting the relationship between the shaft direction position of the WGA output shaft 33 and the actual position Vs detected by the position sensor 53 in Embodiment 1 of this invention. As shown in FIG. 5, the actual position Vs is expressed by voltage [V], and the position sensor 53 outputs the detected actual position Vs in the form of voltage.

In FIG. 5, the position where the shaft direction position is 0 mm corresponds to the position where the WGV 31 completely blocks the exhaust bypass passage 30, that is, the fully closed position of the WGV 31, and the actual position Vs is 1.5 V. In other words, if the shaft direction position of the WGA output shaft 33 is 0 mm, the WGV 31 is located at the fully closed position. When the WGA 34 is installed in the engine 10, the WGA 34 is adjusted so that the actual position Vs becomes 1.5 V when the WGV 31 is in the position of completely blocking the exhaust bypass passage 30, that is, the fully closed position.

A position where the shaft direction position is −3 mm corresponds to a position where the WGA output shaft 33 contacts the closing side stopper inside the WGA 34, that is, a closing side stopper position of the WGA 34, and the actual position Vs becomes 0.5 V. In other words, when the shaft direction position of the WGA output shaft 33 is −3 mm, the WGA output shaft 33 is located at the closing side stopper position. When the WGV 31 is moved to the valve closing side, the WGV 31 reaches the fully closed position first, and the WGA output shaft 33 never contacts the closing side stopper.

A position where the shaft direction position is 7.5 mm corresponds to an opening side upper limit position of the WGV 31, which corresponds to the upper limit value that can be set for the required target opening SV_dem during control. In other words, when the shaft direction position of the WGA output shaft 33 is 7.5 mm, the WGV 31 is located at the opening side upper limit position.

The required target opening Sv_dem computed by the required target opening computing unit 502 is set in a range from the minimum value 0% to the maximum value 100%. Therefore when the fully closed position learning value Pv_lrn matches with the actual fully closed position of the WGV 31, the opening of the WGV 31 is regarded as 0% if the shaft direction position of the WGA 34 is 0 mm, that is, if the actual position Vs is 1.5 V, and the opening of the WGV 31 is regarded as 100% if the shaft direction position of the WGA 34 is 7.5 mm, that is, if the actual position Vs is 4 V. The opening side upper limit position corresponding to the upper limit value (=100%) that can be set for the required target opening Sv_dem is 4.0 V.

A position where the shaft direction position is 9 mm corresponds to a position where the WGA output shaft 33 contacts the opening side stopper inside the WGA 34, that is, an opening side stopper position, and the actual position Vs becomes 4.5 V. In other words, when the shaft direction position of the WGA output shaft 33 is 9 mm, the WGA output shaft 33 is located at the opening side stopper position. In normal control, control is such that the WGA output shaft 33 does not contact the opening side stopper, or the WGA output shaft 33 will contact the opening side stopper at a critical collision speed or less even if the WGA output shaft 33 contacted the opening side stopper.

However, if the fully closed position learning value Pv_lrn is shifted toward the opening side from the actual fully closed position of the WGV 31, the WGA output shaft 33 may contact the opening side stopper at a speed exceeding the critical collision speed. Therefore the later mentioned control according to the flow chart in FIG. 6 is executed, so that contact of the WGA output shaft 33 with the opening side stopper at a speed exceeding the critical collision speed is prevented.

The shaft direction position of the WGA 34, when the WGV 31 moves to the opening side and is located at the opening side contact position contacting with the exhaust passage 15, is designed to be at the opening side of the opening side stopper position of the WGA 34. Hence the WGA output shaft 33 contacts the opening side stopper before the WGV 31 reaches the opening side contact position, even if the WGA output shaft 33 is moved from the closing side to the opening side, therefore the WGV 31 never reaches the opening side contact position.

Now the operations of the controller 50 according to Embodiment 1 will be described with reference to FIG. 6. FIG. 6 is a flow chart depicting a series of operations of the controller 50 according to Embodiment 1 of this invention. The processing operations in the flow chart in FIG. 6 are repeatedly executed at the predetermined control cycle, for example.

Figure 6:
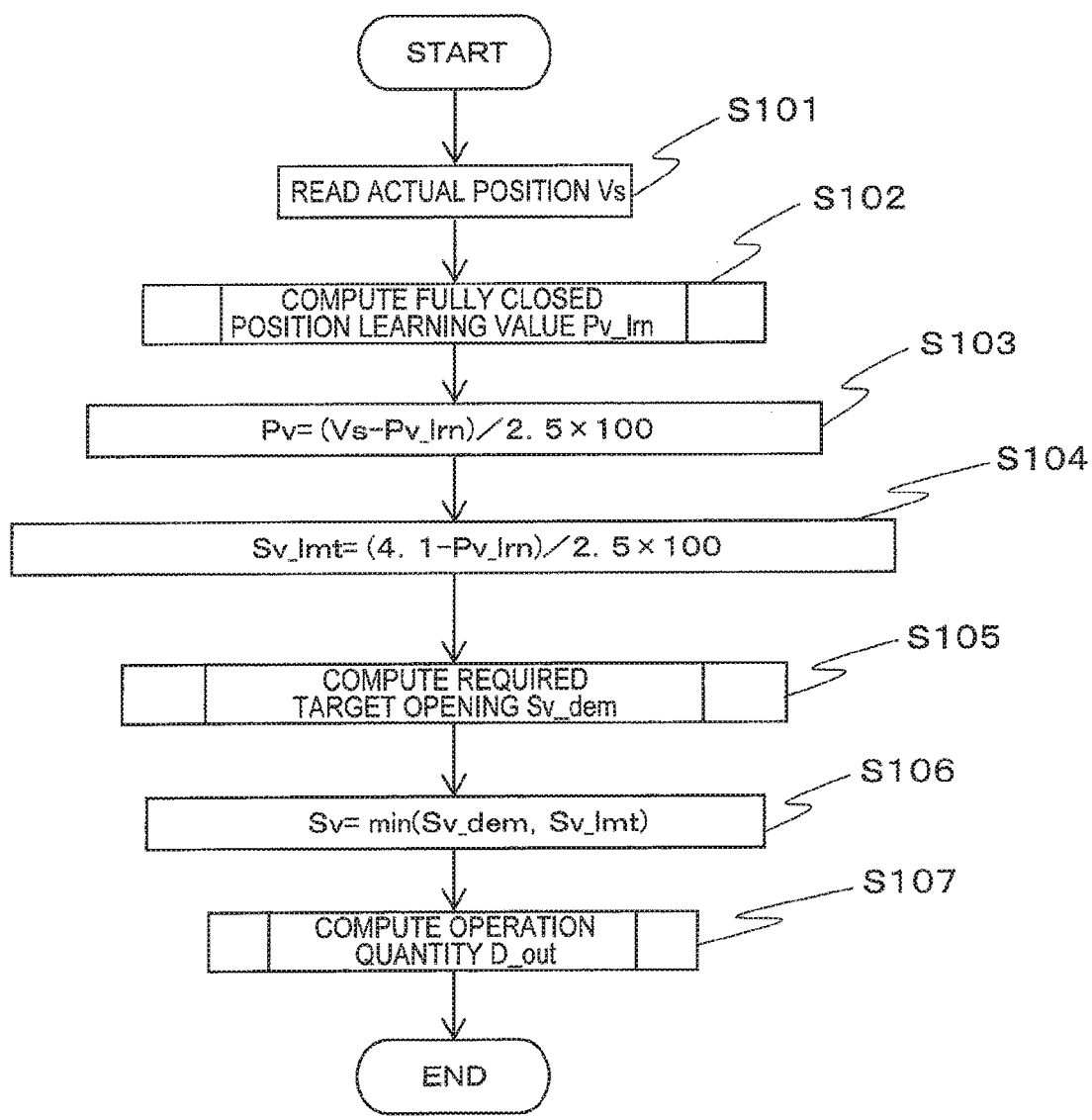
FIG. 6 is a flow chart depicting a series of operations of the controller according to Embodiment 1 of this invention.

In FIG. 6, in step S101, the controller 50 reads the output voltage value of the position sensor 53 as the actual position Vs.

In step S102, the controller 50 jumps to a subroutine to compute the fully closed position learning value Pv_lrn. In the subroutine, the reference position learning unit 503 determines whether the actual position Vs is in a stable state by determining whether the target opening Sv is 0%, which corresponds to the fully closed position, and whether the WGV 31 is located in the fully closed position, and if it is determined that the actual position Vs is in the stable state, the reference position learning unit 503 sets the actual position Vs as the fully closed position learning value Pv_lrn. When it is determined that the actual position Vs is in the stable state, the reference position learning unit 503 may acquire a plurality of actual positions Vs from the position sensor 53, and set an average value of these actual positions Vs as the fully closed position learning value Pv_lrn.

In the case of setting the average value of a plurality of actual positions Vs as the fully closed position learning value Pv_lrn, as mentioned above, if this average value is at a position more at the opening side, beyond the fully closed position learning upper limit value, this fully closed position learning upper limit value is set as the fully closed position learning value Pv_lrn.

If this average value is at a position more at the closing side, beyond the fully closed position learning lower limit value, on the other hand, this fully closed position learning lower limit value is set as the fully closed position learning value Pv_lrn.

The fully closed position learning upper limit value and the fully closed position lower limit value are set in advance as the limit values of a range of the fully closed position learning values Pv_lrn in the case when the output dispersion of the position sensor 53, the dispersion during assembly of the WGA 34 to the engine 10, the temperature change of the WGA 31 or the like occurred. By limiting the update range of the fully closed position learning value Pv_lrn to a range from the fully closed position learning lower limit value to the fully closed position learning upper limit value, learning errors can be prevented.

Immediately after the power of the controller 50 is turned ON, the fully closed position learning value Pv_lrn is set to a predetermined design value as the initial value in the initialization processing routine. If the conditions to update the fully closed position learning value Pv_lrn are established while executing step S102, the fully closed position learning value Pv_lrn is updated from the initial value, or a value learned in the past, to the newly learned value.

In step S103, the actual opening computing unit 504 computes the actual opening Pv of the WGV 31 based on the actual position Vs detected by the position sensor 53, and the fully closed position learning value Pv_lrn which was set by the reference position learning unit 503. In concrete terms, the actual opening computing unit 504 computes the actual opening Pv using the following Expression (1).

$$Pv=(Vs-Pv\_lrn)/2.5\times100 \quad (1)$$

As shown in Expression (1), the actual opening computing unit 504 divides the value generated by subtracting the fully closed position learning value Pv_lrn from the actual position Vs, which is the change amount between the actual position Vs and the fully closed position learning value Pv_lrn, by the maximum change amount allowed for control, that is, 2.5 V (=fully opening position value (4.0 V)–fully closed position value (1.5 V)), and multiplies the result by 100%. In this way, the actual opening computing unit 504 computes the actual opening Pv based on the conversion formula, which is defined regarding the fully closed position value as 0% and the fully opened position value as 100%.

In step S104, the restricted target opening computing unit 505 computes the restricted target opening Sv_lmt of the WGV 31 based on the fully closed position learning value Pv_lrn which was set by the reference position learning unit 503, and the restricted position (=4.1 V) which is set in advance at the closing side of the opening side stopper position (=4.5 V) of the WGA 34. In concrete terms, the restricted target opening computing unit 505 computes the restricted target opening Sv_lmt according to the following Expression (2).

$$Sv\_lmt=(4.1-Pv\_lrn)/2.5\times100 \quad (2)$$

As shown in Expression (2), the restricted target opening computing unit 505 divides the value generated by subtracting the fully closed position learning value Pv_lrn from the restricted target position (=4.1 V), which is the change amount between the restricted target position and the fully closed position learning value Pv_lrn, by the maximum change amount allowed for control, that is, 2.5 V (=fully opened position value (4.0 V)–fully closed position value (1.5 V)), and multiplies the result by 100%. In this way, the restricted target opening computing unit 505 computes the restricted target opening Sv_lmt based on the conversion formula, which is defined regarding the fully closed position value as 0% and the fully opened position value as 100%.

Here as shown in FIG. 5, if the design value (=1.5 V) corresponding to the fully closed position of the WGV 31 is used as the reference, the opening side upper limit position of the WGV 31 is determined as 4.0 V. The restricted target position is set in advance at the closing side of the opening side stopper position (=4.5 V) of the WGA 34.

In concrete terms, the restricted target position is set to locate at the opening side of the opening side upper limit position (=4.0 V), and at the closing side of the opening side stopper position (=4.5 V) of the WGA 34. In other words, the restricted target position is set to have a value between the opening side upper limit position (=4.0 V), corresponding to the upper limit value (=100%) which can be set as the restricted target opening Sv_dem, and the opening side stopper position (=4.5 V) of the WGA 34.

In Embodiment 1, a case of setting the restricted target position to 4.1 V is described as an example of the restricted target position which is set according to these setting conditions.

The opening side stopper position of the WGA 34 is not changed even if the fully closed position of the WGV 31 is changed by the thermal expansion of the WGV 31, the abrasion of the contact area between the WGV 31 and the exhaust bypass passage 30 and the like. Therefore by setting the restricted target position as described above, the restricted target position can be set to a position which has a predetermined opening deviation from the opening side stopper position.

In step S105, the controller 50 jumps to a subroutine to compute the required target opening Sv_dem of the WGV 31. In the subroutine, the required target opening computing unit 502 computes the required target opening Sv_dem to match the target supercharging pressure Sp determined from the map in FIG. 4 and the actual supercharging pressure Pp with each other.

In step S106, the target opening restricting unit 506 computes the target opening Sv using the following Expression (3).

$$Sv=\min(Sv\_dem,Sv\_lmt) \quad (3)$$

As shown in Expression (3), the target opening restricting unit 506 sets the smaller of: the required target opening Sv_dem computed in step S105; and the restricted target opening Sv_lmt computed in step S104, as the target opening Sv.

In this case, even if the fully closed position of the WGV 31 is changed due to the thermal expansion of WGV 31, the abrasion of the contact area between the WGV 31 and the exhaust bypass passage 30 and the like, the opening side stopper position of the WGA 34 does not change. Further, in step S107, the smaller of the required target opening Sv_dem and the restricted target opening Sv_lmt, that is, a value generated by restricting the required target opening Sv_dem by the restricted target opening Sv_lmt is set as the target opening Sv. Hence even if the fully closed position learning value Pv_lrn is changed, the smaller of the required target opening Sv_dem and the restricted target opening Sv_lmt is set as the target opening Sv. As a consequence, contact of the WGA output shaft 33 with the opening side stopper of the WGA 34 at a speed exceeding the critical collision speed can be prevented.

In step S107, the controller 50 jumps to a subroutine to compute the operation quantity D_out. In the subroutine, the operation quantity computing unit 507 computes the operation quantity D_out that is required for the actual opening Pv to track the target opening Sv by performing feedback control, so that the deviation between the actual opening Pv and the target opening Sv becomes 0.

Here the operation quantity D_out is a Duty value. To operate the WGV 31 to the opening side, a plus value of the operation quantity D_out is computed, and to operate the WGV 31 to the closing side, a minus value of the operation quantity D_out is computed. In the operation quantity D_out, the maximum value is 100%, and the minimum value is −100%. If the operation quantity D_out is 0%, the WGV 31 stops where the WGV 31 is located, unless a disturbance is generated in the WGV 31.

Figure 7:
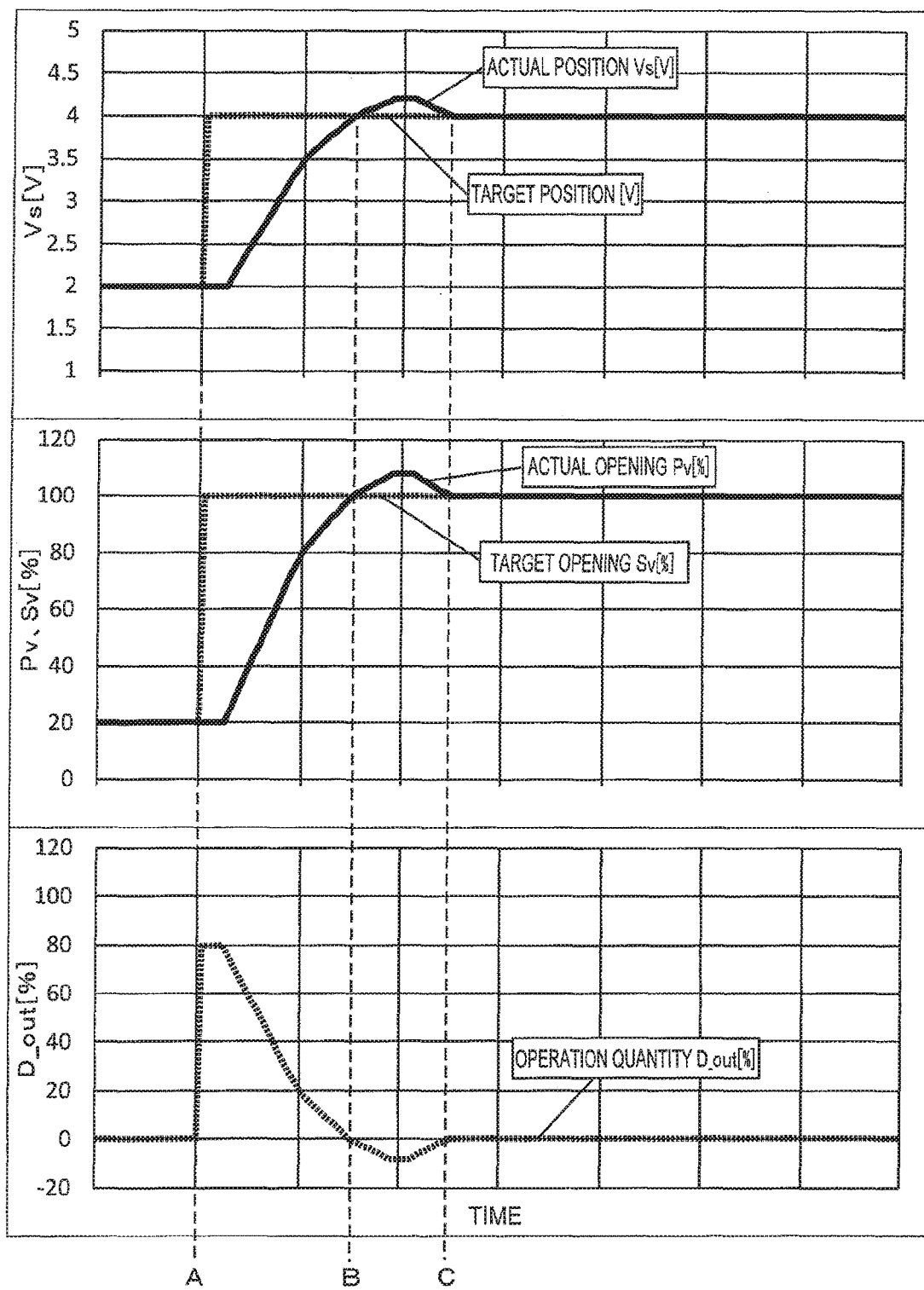
FIG. 7 is a time chart depicting a target opening, an actual opening and an operation quantity which are computed by the controller according to Embodiment 1 of this invention.
Figure 8:
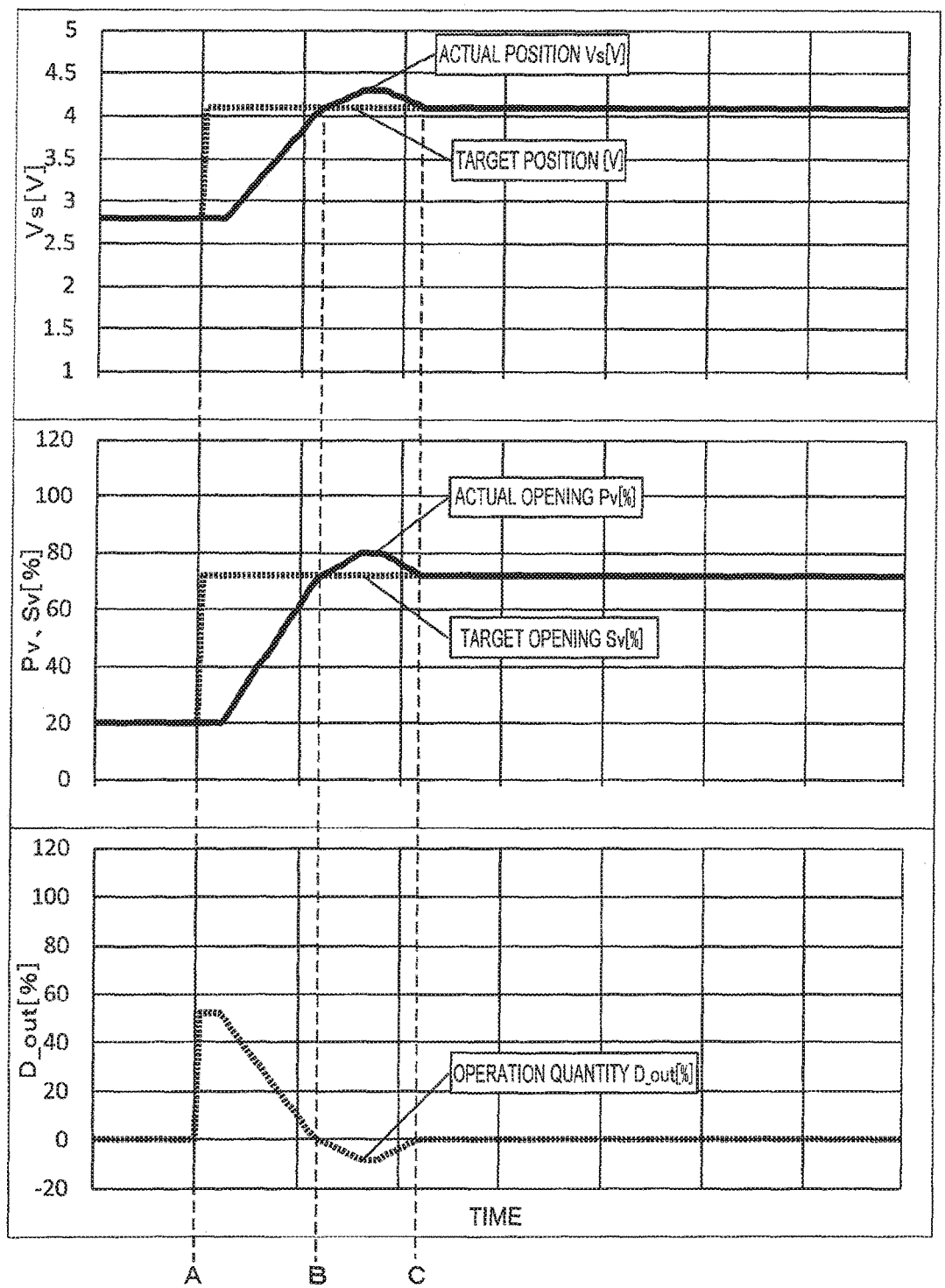
FIG. 8 is a time chart depicting a target opening, an actual opening and an operation quantity which are computed by the controller according to Embodiment 1 of this invention.
Figure 9:
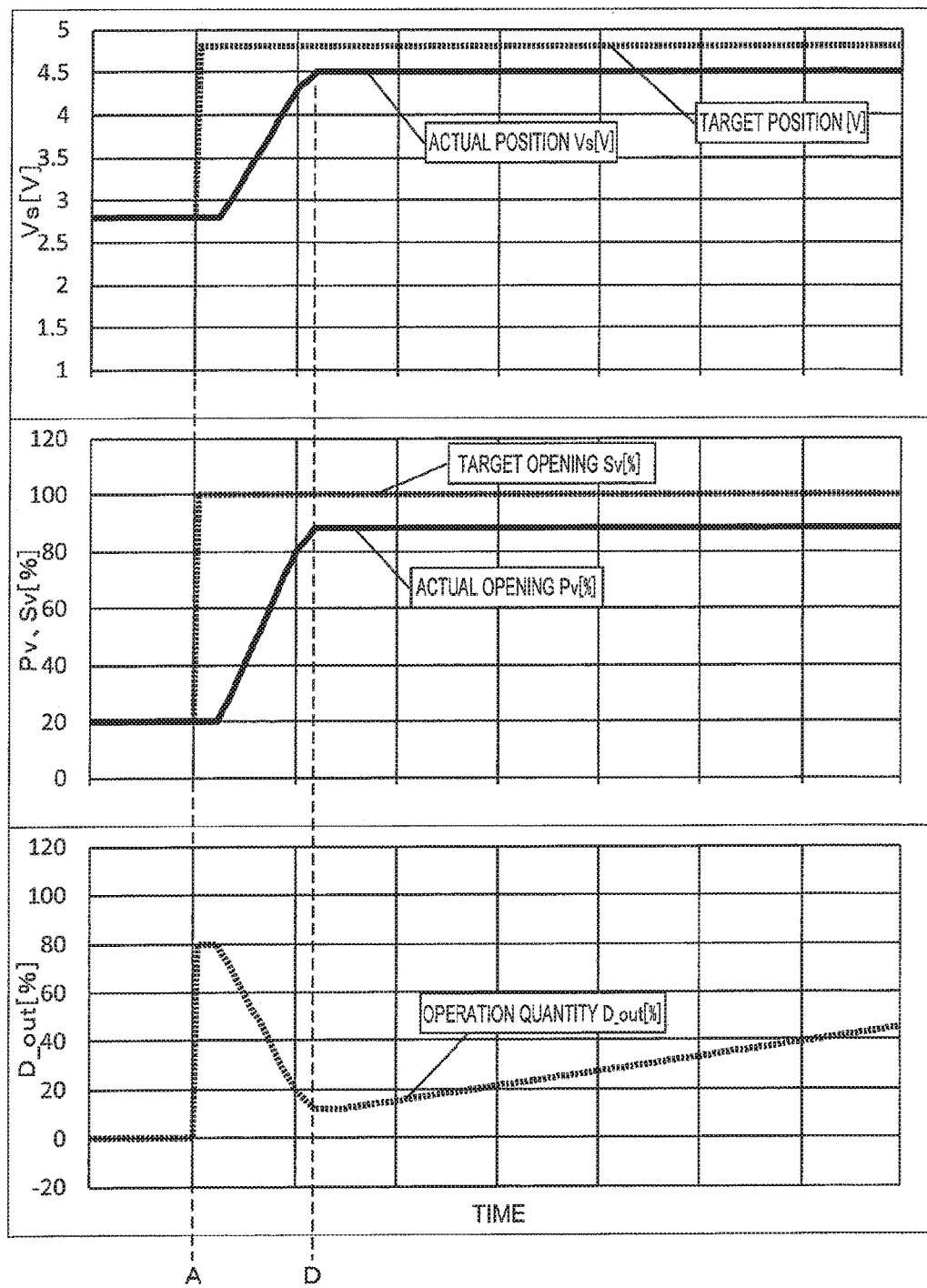
FIG. 9 is a time chart depicting a comparative example of FIG. 8.

Now an example of the respective time-based changes of the target opening Sv, the actual opening Pv, and the operation quantity D_out, which are computed when the processing operations in the flow chart in FIG. 6 are executed, will be described with reference to FIGS. 7 to 9. FIGS. 7 and 8 are time charts showing the target opening Sv, the actual opening Pv and the operation amount D_out computed by the controller 50 according to Embodiment 1 of this invention. FIG. 9 is a time chart showing comparative examples of FIG. 8.

In FIGS. 7 to 9, the target position indicated in the top graph is a value generated by converting the % value of the target opening Sv indicated in the second graph from the top into a voltage value using the design value (=1.5 V) corresponding to the fully closed position of the WGV 31. This target position is not indicated in FIGS. 3 and 6.

The time chart in FIG. 7 will be described first. In FIG. 7, it is assumed that the fully closed position learning value Pv_lrn matches with the actual fully closed position of the WGV 31, and is the same as the WGV fully closed position (=1.5 V) indicated in FIG. 5.

Before time point A, that is, at the left side of time point A in FIG. 7, the target opening Sv is 20%, to control the supercharging pressure. At this time, the actual position Vs is 2 V. The actual opening Pv, which was converted from the actual position Vs using Expression (1), is feedback-controlled so as to match with the target opening Sv.

Here the restricted target opening Sv_lmt computed using Expression (2) is 104%, since the fully closed position learning value Pv_lrn is 1.5 V and the restricted target position is 4.1 V. Therefore at time point A, if the required target opening Sv_dem changes from 20% to 100%, the target opening Sv also changes from 20% to 100%, and the actual opening Pv starts to track the target opening Sv by feedback control.

At time point B, the actual opening Pv exceeds the target opening Sv, and the actual position Vs exceeds the WGV opening side upper limit position (=4.0 V). The value of the required target opening Sv_dem, which is 100%, is continuously set as the target opening Sv.

Between time points B and C, the actual opening Pv overshoots the target opening Sv at the opening side, hence the operation quantity D_out becomes a minus value by feedback control. At time point C, the actual opening Pv is converged at the target opening Sv by feedback control.

In this way, in the case when the fully closed position learning value Pv_lrn matches with the actual fully closed position of the WGV 31 and is the same as the WGV fully closed position (=1.5 V) indicated in FIG. 5, the required target opening Sv_dem is directly set as the target opening Sv, without being restricted by the restricted target opening Sv_lmt. As a consequence, the actual opening Pv is quickly converged at the target opening Sv by feedback control.

The time chart in FIG. 9, which is a comparative example of FIG. 8, will be described next. FIG. 9 shows a case, as a comparative example, when a controller, which does not include the restricted target opening computing unit 505 and the target opening restricting unit 506, directly sets the required target opening Sv_dem as the target opening Sv.

In FIG. 9, it is assumed that the fully closed position learning was performed by setting the fully closed position learning value Pv_lrn to 2.3 V, then the temperature conditions, the operating conditions and the like changed over time, and the actual fully closed position of the WGV 31 changed in the direction to the closing side compared with the time point when the fully closed position learning was first performed. In this case, the fully closed position learning value Pv_lrn does not match with the actual fully closed position of the WGV 31, and has a value at the opening side of the actual fully closed position of the WGV 31.

Before time point A, that is, at the left side of time point A in FIG. 9, the target opening Sv is 20% to control the supercharging pressure. At this time, the actual position Vs is 2.8 V. The actual opening Pv, which was converted from the actual position Vs using Expression (1), is feedback-controlled so as to match with the target opening Sv.

At time point A, when the required target opening Sv_dem changes from 20% to 100%, the target opening Sv also changes from 20% to 100%, and the actual opening Pv starts to track the target opening Sv by feedback control.

At time point D, the actual position Vs becomes 4.5 V, and the WGA output shaft 33 contacts with the opening side stopper of the WGA 34, hence the WGV 31 can no longer operate in the direction to the opening side. The actual opening Pv at this time is 88%, and has not reached the target opening Sv, which is 100%. Therefore after time point D, the operation quantity D_out further increases by feedback control, and the heat value of the WGA 34 increases.

The time chart in FIG. 8 will be described next. In FIG. 8, it is assumed that the fully closed position learning was performed by setting the fully closed position learning value Pv_lrn to 2.3 V, then the temperature conditions, the operating conditions and the like changed over time, and the actual fully closed position of the WGV 31 changed to the closing side compared with the time point when the fully closed position learning was first performed. In this case, the fully closed position learning value Pv_lrn does not match with the actual fully closed position of the WGV 31, and has a value at the opening side of the actual fully closed position of the WGV 31.

Before time point A, that is, at the left side of time point A in FIG. 8, the target opening Sv is 20% to control the supercharging pressure. At this time, the actual position Vs is 2.8 V. The actual opening Pv, which was converted from the actual position Vs using Expression (1), is feedback-controlled so as to match with the target opening Sv.

Here the restricted target opening Sv_lmt computed using Expression (2) is 72%, since the fully closed position learning value Pr_lrn is 2.3 V and the restricted target position is 4.1 V. Therefore at time point A, even if the required target opening Sv_dem changes from 20% to 100%, the target opening Sv changes from 20% to 72%, and the actual opening Pv starts to track the target opening Sv by feedback control.

In other words, the restricted target opening Sv_lmt, which is the smaller of: the value of the required target opening Sv_dem which is 100%; and the value of the restricted target opening Sv_lmt which is 72%, is set as the target opening Sv.

Between time points B and C, the actual opening Pv overshoots the target opening Sv at the opening side, hence the operation quantity D_out becomes a minus value by feedback control. At time point C, the actual opening Pv is converged to the target opening Sv by feedback control.

In this way, even if the fully closed position learning value Pv_lrn has a value that is at the opening side of the actual fully closed position of the WGV 31, the required target opening Sv_dem is restricted by the restricted target opening Sv_lmt, and the actual opening Pv is quickly converged to the target opening Sv by feedback control. As a result, the actual position Vs quickly reaching 4.5 V, which is the opening side stopper position of the WGA 34, can be prevented.

It is assumed that the fully closed position learning value Pv_lrn is learned when the actual fully closed position is changed in the direction to the opening side due to thermal expansion or the like, and that the actual fully closed position is changed in the direction to the closing side due to temperature change and the like, but the fully closed position learning value Pr_lrn is not updated, and the fully closed position learning value Pv_lrn is at the opening side of the actual fully closed position. Even in such a case, the WGA output shaft 33 can contact the opening side stopper of the WGA 34 at the critical collision speed or less, or contact of the WGA output shaft 33 with the opening side stopper can be prevented. As a consequence, an annoying collision noise that is generated when the WGA output shaft 33 contacts with the opening side stopper can be prevented.

According to Embodiment 1, the smaller of: the required target opening, which was computed to make the target supercharging pressure and the actual supercharging pressure match with each other; and the restricted target opening, which was computed based on the fully closed learning value corresponding to the actual position detected by the position sensor when the valve is located in the fully closed position; and the restricted target position, is set as the target opening of the valve.

By restricting the required target opening using the restricted target opening like this, the position corresponding to the target opening of the valve can be restricted to a position at the closing side of the opening side stopper of the actuator. As a result, when the actual opening becomes close to the target opening by feedback control, the change speed of the actual opening decelerates, and the generation of an annoying collision noise, caused by the output shaft of the actuator colliding with the opening side stopper of the actuator at a speed exceeding the critical collision speed, can be prevented. The abnormal heating of the motor of the actuator can also be suppressed.

Embodiment 2

In Embodiment 2 of this invention, a controller 50 configured to compute the target opening Sv by a processing that is different from Embodiment 1 will be described. In Embodiment 2, description on the aspects that are the same as Embodiment 1 is omitted, and aspects that are different from Embodiment 1 will primarily be described.

Here an engine system to which the controller 50 of Embodiment 2 is applied and the controller 50 are implemented using the same configuration as FIGS. 1 to 3.

Figure 10:
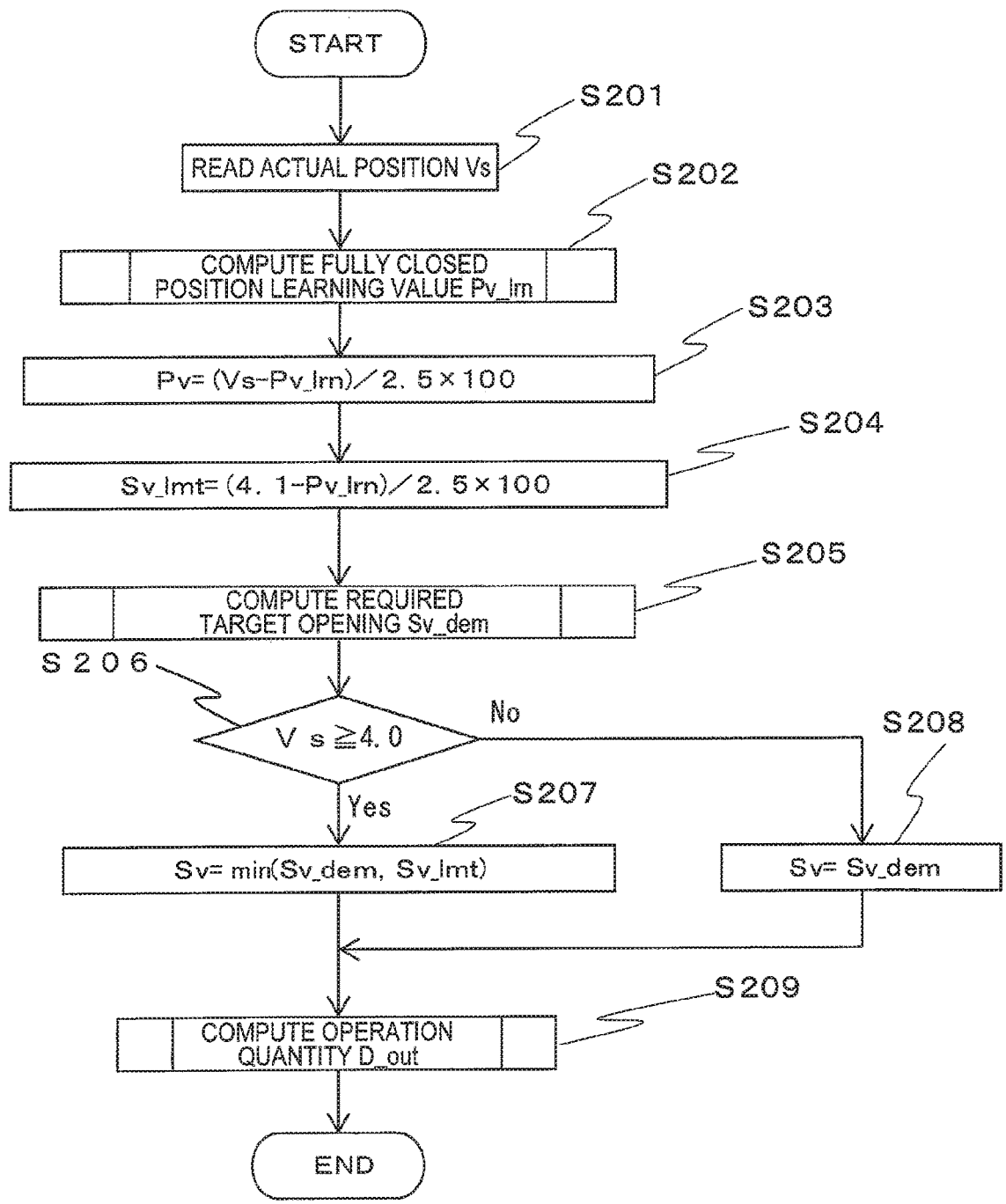
FIG. 10 is a flow chart depicting a series of operations of a controller according to Embodiment 2 of this invention.

FIG. 10 is a flow chart depicting a series of operations of the controller 50 according to Embodiment 2 of this invention. The processing operations in the flow chart in FIG. 10 are repeatedly executed at a predetermined control cycle, for example.

In steps S201 to S205 in FIG. 10, processing operations the same as steps S101 to S105 in FIG. 6 described above are executed.

In step S206, the target opening restricting unit 506 determines whether the actual position Vs detected by the position sensor 53 is not less than a restriction determination position which is set in advance. In Embodiment 2, a case of setting the restriction determination position to the WGV opening side upper limit position (=4.0 V) will be described as an example.

If it is determined that the actual position Vs detected by the position sensor 53 is not less than the restriction determination position in step S206, processing advances to step S207. If it is determined that the actual position Vs detected by the position sensor 53 is less than the restriction determination position, on the other hand, processing advances to step S208.

In step S207, the processing the same as step S106 in FIG. 6 is executed. In other words, the target opening restricting unit 506 computes the target opening Sv according to the following Expression (3).

$$Sv = \min(Sv\_dem, Sv\_lmt) \quad (3)$$

As shown in Expression (3), the target opening restricting unit 506 sets the smaller of: the required target opening Sv_dem computed in step S205; and the restricted target opening Sv_lmt computed in step S204, as the target opening Sv.

In this way, if the actual position Vs detected by the position sensor 53 is not less than the restriction determination position, the target opening restricting unit 506 sets the smaller of: the required target opening Sv_dem computed by the required target opening computing unit 502; and the restricted target opening Sv_lmt computed by the restricted target opening computing unit 505, as the target opening Sv.

In step S208, the target opening restricting unit 506 computes the target opening Sv using the following Expression (4).

$$Sv = Sv\_dem \quad (4)$$

As shown in Expression (4), the target opening restricting unit 506 sets the required target opening Sv_dem computed in step S205 as the target opening Sv.

In this way, if the actual position Vs detected by the position sensor 53 is less than the restriction determination position, the target opening restricting unit 506 sets the required target opening Sv_dem, computed by the required target opening computing unit 502, as the target opening Sv.

In this case, even if the fully closed position of the WGV 31 is changed due to the thermal expansion of the WGV 31, the abrasion of the contact area between the WGV 31 and the exhaust bypass passage 30 and the like, the opening side stopper position of the WGA 34 does not change. Further, in step S206, the actual position Vs and the restriction determination position (=4.0 V) are compared, and processing in either step S207 or step S208 is executed according to this comparison result, whereby the target opening Sv is computed. Hence even if the fully closed position learning value Pv_lrn is changed, the smaller of the required target opening Sv_dem and the restricted target opening Sv_lmt, is set as the target opening Sv, when the WGA output shaft 33 reaches the position at the closing side which deviated by a predetermined amount from the opening side stopper of WGA 34. As a consequence, contact of the WGA output shaft 33 with the opening side stopper of the WGA 34 exceeding the critical collision speed can be prevented.

In step S209, processing the same as step S107 in FIG. 6 is executed.

Figure 11:
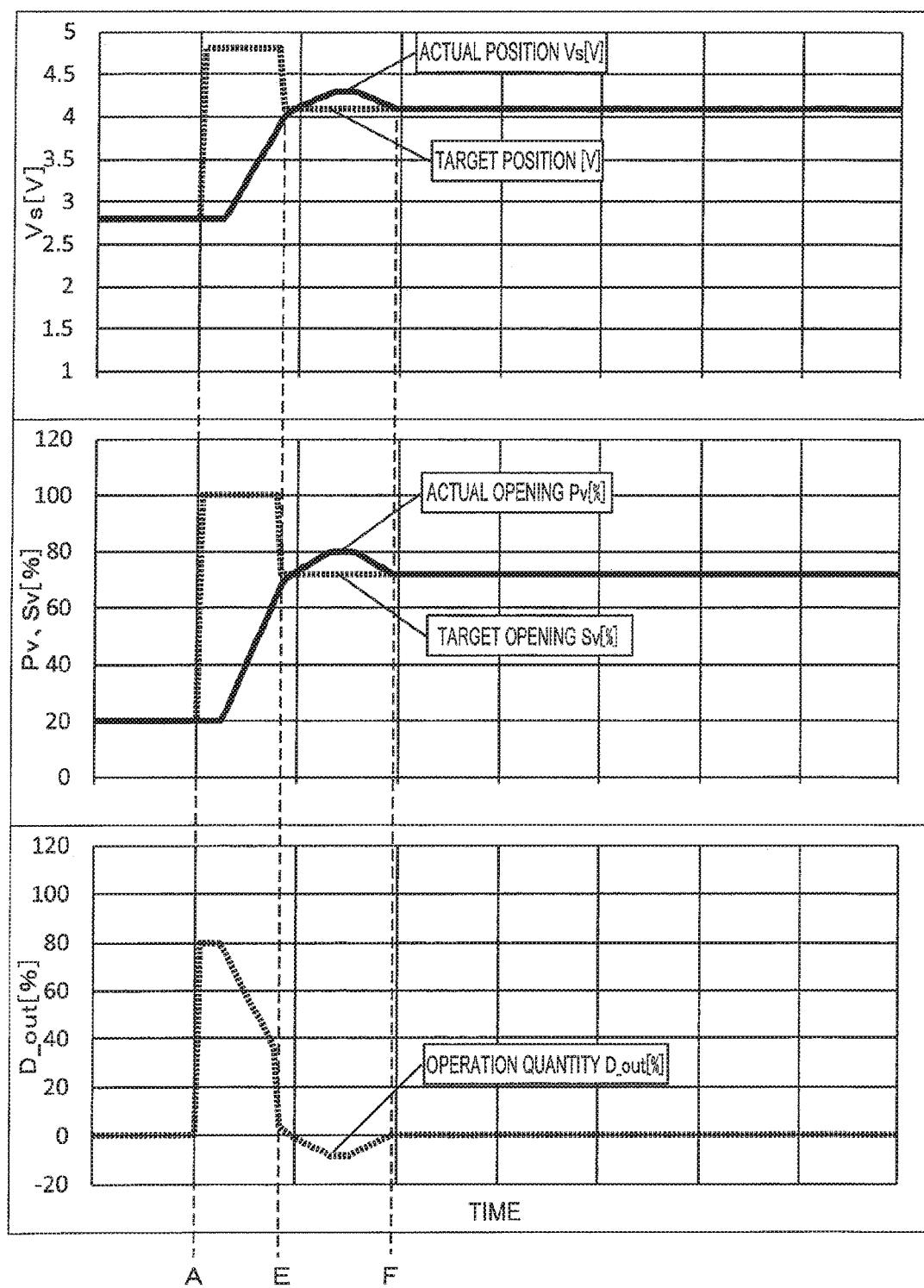
FIG. 11 is a time chart depicting a target opening, an actual opening and an operation quantity which are computed by the controller according to Embodiment 2 of this invention.

Now an example of the respective time-based changes of the target opening Sv, the actual opening Pv, and the operation quantity D_out, which are computed when the processing operations in the flow chart in FIG. 10 are executed, will be described with reference to FIG. 11. FIG. 11 is a time chart showing the target opening Sv, the actual opening Pv, and the operation quantity D_out computed by the controller 50 according to Embodiment 2 of this invention.

In FIG. 10, it is assumed that the fully closed position learning was performed by setting the fully closed position learning value Pv_lrn to 2.3 V, then the temperature conditions, the operating conditions and the like changed over time, and the actual fully closed position of the WGV 31 changed in the direction to the closing side from the time point when the fully closed position learning was performed. In this case, the fully closed position learning value Pv_lrn does not match with the actual fully closed position of the WGV 31, and has a value at the opening side of the actual fully closed position of the WGV 31.

Before time point A, that is, at the left side of time point A in FIG. 11, the target opening Sv is 20% to control the supercharging pressure. At this time, the actual position Vs is 2.8V. The actual opening Pv, which was converted from the actual position Vs using Expression (1), is feedback-controlled so as to match with the target opening Sv.

At time point A, the actual position Vs does not exceed the restriction determination position (=4.0 V), therefore the target opening Sv is computed using Expression (4). Therefore at time point A, when the required target opening Sv_dem changes from 20% to 100%, the target opening Sv also changes from 20% to 100%, and the actual opening Pv starts to track the target opening Sv by feedback control.

At time point E, the actual position Vs exceeds the restriction determination position (=4.0 V), hence the target opening Sv is computed using Expression (3). As a consequence, at time point E, the target opening Sv is controlled to be the restricted target opening Sv_lmt (=72%). As a result, the target opening Sv changes from 100% to 72%, and the difference between the target opening Sv and the actual opening Pv decreases, and the operation quantity D_out also decreases.

The speed of the actual opening Pv changing in the direction to the opening side slows, but the actual opening Pv exceeds the target opening Sv, and the operation quantity D_out becomes a minus value by feedback control, whereby the actual opening Pv is converged to the target opening Sv at time point F. As a result, reaching of the actual position Vs to 4.5 V, which is the opening side stopper position of the WGA 34, can be prevented.

The operation quantity D_out is higher in a period from time point A, when the operation quantity D_out is computed based on the difference between the target opening Sv (=100%) and the actual opening Pv, to time point E, than in a period after time point E when the operation quantity D_out is computed based on the difference between the target opening Sv (=72%) and the actual opening Pv. Therefore in the period from time point A, when the actual position Vs is less than the restriction determination position (=4.0 V), to time point E, the required target opening Sv_dem is directly set as the target opening Sv using Expression (4), so that the actual opening Pv can track the target opening Sv more quickly. On the other hand, in the period after time point E when the actual position Vs is or exceeds the restriction determination position (=4.0 V), the smaller of the required target opening Sv_dem and the restricted target opening Sv_lmt is set as the target opening Sv, whereby reaching of the actual position Vs to 4.5 V, which is the opening side stopper position of the WGA 34, can be prevented.

According to Embodiment 2, the smaller of the required target opening and the restricted target opening is set as the target opening if the actual position detected by the position sensor is not less than the restriction determination position, and the required target opening is set as the target opening if the actual position is less than the restriction determination position.

Therefore when the actual position does not reach the restriction determination position, the required target opening is not restricted by the restricted target opening, hence the valve opening operation, based on feedback control, can be quickened. In other words, in the case of the actual opening which does not cause contact of the output shaft of the actuator with the opening side stopper, the valve opening speed of the WGV can be increased by performing feedback control based on the difference between the required target opening and the actual opening.

When the actual position reaches the restriction determination position, the required target opening is restricted by the restricted target opening if necessary, hence contact of the output shaft of the actuator with the opening side stopper, at a speed exceeding the critical collision speed, can be prevented. In other words, in the case of an actual opening, which may cause contact of the output shaft of the actuator with the opening side stopper, the feedback control is performed based on the difference between the restricted target opening Sv_lmt and the actual opening Pv, whereby contact of the output shaft of the actuator with the opening side stopper is prevented, or contact of the output shaft of the actuator with the opening side stopper, at a speed exceeding the critical collision speed, can be prevented.

In Embodiments 1 and 2, the present invention was described using the waste gate valve as an example of a valve of which opening is adjusted by operating the actuator, but the present invention can also be applied to a valve driven by electric energy, such as an exhaust gas recirculation (EGR) valve.

What is claimed is:

1. A controller for an internal combustion engine, the controller controlling a flow rate of exhaust gas of the internal combustion engine which flows to a turbocharger, by operating an actuator to adjust an opening of a valve, and the controller comprising at least one microprocessor comprising:

a target supercharging pressure computing unit configured to compute a target supercharging pressure, based on an operating state of the internal combustion engine;

a required target opening computing unit configured to compute a required target opening of the valve that allows the target supercharging pressure computed by the target supercharging pressure computing unit to match with an actual supercharging pressure detected by a supercharging pressure sensor configured to detect a pressure of intake air of the internal combustion engine, which has been supercharged by the turbocharger;

a reference position learning unit configured to set, as a fully closed position learning value, an actual position of the valve detected by a position sensor, when the valve is located in a fully closed position;

an actual opening computing unit configured to compute an actual opening of the valve, based on the actual position detected by the position sensor and the fully closed position learning value which has been set by the reference position learning unit;

a restricted target opening computing unit configured to compute a restricted target opening of the valve, based on the fully closed position learning value which has been set by the reference position learning unit and a restricted target position which has been set, in advance, to have a value between an opening side upper limit position of the actuator and an opening side stopper position of the actuator, wherein the opening side upper limit position corresponds to an upper limit value of the required target opening, and the opening side stopper position corresponds to a position at which an output shaft of the actuator contacts an opening side stopper of the valve;

a target opening restricting unit configured to set, as a target opening of the valve, the smaller of: the required target opening computed by the required target opening computing unit; and the restricted target opening computed by the restricted target opening computing unit;

an operation quantity computing unit configured to compute an operation quantity to operate the actuator, so that the actual opening computed by the actual opening computing unit follows the target opening which has been set by the target opening restricting unit; and a driving unit configured to operate the actuator in accordance with the operation quantity computed by the operation quantity computing unit.

2. The controller for the internal combustion engine according to claim 1, wherein
the target opening restricting unit
sets, as the target opening, the smaller of: the required target opening which has been computed by the required target opening computing unit and the restricted target opening which has been computed by the restricted target opening computing unit, in a case where the actual position detected by the position sensor is not less than a restriction determination position which is set in advance, and
sets, as the target opening, the required target opening computed by the required target opening computing unit, in a case where the actual position detected by the position sensor is less than the restriction determination position.

3. The controller for the internal combustion engine according to claim 1, wherein
the target opening restricting unit
sets, as the target opening, the smaller of: the required target opening which has been computed by the required target opening computing unit and the restricted target opening which has been computed by the restricted target opening computing unit, in a case where the actual position detected by the position sensor is not less than a restriction determination position which is set in advance, and
sets, as the target opening, the required target opening computed by the required target opening computing unit, in a case where the actual position detected by the position sensor is less than the restriction determination position.

4. A control method for an internal combustion engine to control a flow rate of exhaust gas of the internal combustion engine which flows to a turbocharger, by operating an actuator to adjust an opening of a valve,
wherein the control method is performed by at least one microprocessor and comprises:
a target supercharging pressure computing step of computing a target supercharging pressure, based on an operating state of the internal combustion engine;
a required target opening computing step of computing a required target opening of the valve that allows the target supercharging pressure computed in the target supercharging pressure computing step to match with an actual supercharging pressure detected by a supercharging pressure sensor configured to detect a pressure of intake air of the internal combustion engine, which has been supercharged by the turbocharger;
a reference position learning step of setting, as a fully closed position learning value, an actual position of the valve detected by a position sensor, when the valve is located in a fully closed position;
an actual opening computing step of computing an actual opening of the valve, based on the actual position detected by the position sensor and the fully closed position learning value which has been set in the reference position learning step;
a restricted target opening computing step of computing a restricted target opening of the valve, based on the fully closed position learning value which has been set in the reference position learning step and a restricted target position which has been set, in advance, to be have a value between an opening side upper limit position of the actuator and an opening side stopper position of the actuator, wherein the opening side upper limit position corresponds to an upper limit value of the required target opening, and the opening side stopper position corresponds to a position at which an output shaft of the actuator contacts an opening side stopper of the valve;
a target opening restricting step of setting, as a target opening of the valve, the smaller of: the required target opening computed in the required target opening computing step; and the restricted target opening computed in the restricted target opening computing step;
an operation quantity computing step of computing an operation quantity to operate the actuator so that the actual opening computed in the actual opening computing step follows the target opening which has been set in the target opening restricting step; and
a driving step of operating the actuator in accordance with the operation quantity computed in the operation quantity computing step.

* * * * *